United States Patent [19]
Yanagi et al.

[11] Patent Number: 5,657,321
[45] Date of Patent: *Aug. 12, 1997

[54] LOOPED BUS SYSTEM FOR CONNECTING PLURAL NODES OR PLURAL CIRCUIT CARDS

[75] Inventors: Junichirou Yanagi, Kodaira; Akihiko Takase, Tokyo; Setsuo Takahashi, Yokohama, all of Japan

[73] Assignee: Hitachi, Ltd., Tokyo, Japan

[*] Notice: The term of this patent shall not extend beyond the expiration date of Pat. No. 5,487,062.

[21] Appl. No.: 566,702

[22] Filed: Dec. 4, 1995

Related U.S. Application Data

[63] Continuation of Ser. No. 230,152, Apr. 19, 1994, Pat. No. 5,487,062.

[30] Foreign Application Priority Data

Apr. 19, 1993 [JP] Japan ................................ 5-091065

[51] Int. Cl.$^6$ ........................................ H04L 12/437
[52] U.S. Cl. ................................. 370/222; 370/452
[58] Field of Search ........................ 370/16, 16.1, 85.4, 370/85.5, 85.9, 85.12, 60, 94.1, 217, 221, 222, 452; 371/8.1, 8.2, 11.1, 11.2

[56] References Cited

U.S. PATENT DOCUMENTS

| | | | |
|---|---|---|---|
| Re. 28,958 | 9/1976 | Zafiopulo et al. | 371/11.2 X |
| 4,696,001 | 9/1987 | Gagliardi et al. | 370/85.12 X |
| 4,922,244 | 5/1990 | Hullett et al. | 340/835.5 |
| 5,157,657 | 10/1992 | Potter et al. | 370/85.1 X |
| 5,333,130 | 7/1994 | Weissmann et al. | 370/16 |
| 5,487,062 | 1/1996 | Yanagi et al. | 370/16.1 |

OTHER PUBLICATIONS

"Distributed Queue Dual Bus (DQBE) Subnetwork of a Metropolitan Area Network (MAN)" IEEE 802.6 Standard, Dec. 1990, pp. 58–61, 76–85, 317–337.

*Primary Examiner*—Russell W. Blum
*Attorney, Agent, or Firm*—Antonelli, Terry, Stout & Kraus, LLP

[57] ABSTRACT

A looped bus system includes several nodes connected by unidirectional buses having opposite directions of signal transmission. The head of bus function for each bus is located at a node different from the head of bus function for the other bus. The head of bus function for each bus is located at the same node as the termination of bus function for the other bus. As a result, the buses can be reconfigured and nodes can be added freely by the use of a bus portion that is unused in the looped bus under normal condition.

7 Claims, 13 Drawing Sheets

LOOPED BUS SYSTEM FOR CONNECTING PLURAL NODES OR PLURAL CIRCUIT CARDS

This application is a continuation of application Ser. No. 08/230,152, filed Apr. 19, 1994 now U.S. Pat. No. 5,487,062.

BACKGROUND OF THE INVENTION

1. Field of the Invention

The present invention relates to a looped bus system, or more in particular to a looped bus system having functionally-separate starting and terminating points and suitable for communication between a plurality of card-like circuit members in a single housing, and to a method of construction thereof.

2. Description of the Related Art

In a public communication network, what is called a switching system is used which is operated for selecting an optimum route in accordance with the address of transmitted information in order to transmit the information to a given address and apply the information to a selected output port.

The switching system includes a plurality of pairs of input-output ports. The function is essential for transferring information from an arbitrary interface card accommodating an input port to a given interface card accommodating an output port. In order to secure communication between given input and output ports, the conventional switching system includes a space switch having hardware configured in a matrix and a time switch for selecting an arbitrary destination by changing the temporal position.

It is also possible to realize an information exchange function by the input interface card and the output interface card accessing the shared medium. The medium shared by a plurality of cards for the purpose of communication is generally called a "bus".

In "Distributed Queue Dual Bus (DQDB) Subnetwork of a Metropolitan Area Network", IEEE 802.6 (December 1990) proposed by IEEE engaged in preparing international standards, a special shape of bus is made thereby to realize an additional function.

FIGS. 2 and 3 are diagrams showing the conventional bus configuration described in the aforementioned reference. FIG. 2 shows the bus state under normal condition. In this specification, elements 10-1 to 10-6, providing a source and a destination of information transmitted through the bus, are called "nodes". Each node is connected to a pair of buses 20a, 20b making up a shared medium. Each bus is a unidirectional one with a predetermined signal transmission direction. In order to permit communication between given nodes, the nodes are connected by two buses having opposite directions of signal transmission.

In the description that follows, one of the buses in pair is called "bus A" 20a, and the other "bus B" 20b for the sake of convenience. Each bus has a starting point and a terminal, called "head of bus" and "terminal of bus" hereinafter respectively.

Also, the node having a head of bus is called "head of bus A" or "head of bus B". Each head of bus has a head of bus function 30a or 30b, and each terminal of bus includes a termination of bus function 31a or 31b. The head of bus function and the termination of bus function will be described in more detail later.

FIG. 2 shows a case in which the head of bus function and the termination of bus function of the buses 20a, 20b exist in the same node 10-1.

As shown in FIG. 2, the bus form with the bus configured in loop is generally called the looped bus, in which transfer information is discarded at the terminal of bus thereby preventing the same information from going round the same bus.

FIG. 3 shows the state of a bus in which a failure condition 40, caused by a defect of the medium, etc., occurred in a part of the bus.

In the case where a failure condition has occurred between the nodes 10-4 and 10-5, for example, the head of bus and the terminal of bus for the node 10-1 that have thus far been separated from each other come to be connected, and the head of bus function and the termination of bus function are transferred to another node. In this way, communication is made possible among all the nodes.

For example, the node 10-5, one of the nodes adjacent to the point of failure, is used to perform the function 30a of head of bus A and the function 31b of termination of bus B. Also, the function 31a of terminal of bus A and the function 30b of head of bus B are performed by the other node 10-4 adjacent to the point of failure. In this way, the transfer of the head and termination of bus under failure condition is called "bus reconfiguration", whereby the communication sharing the bus A 20a and the bus B 20b is made possible between arbitrary nodes.

According to the looped bus system described in the above-mentioned reference, each node is an independent device, and the looped bus is used as a transmission line connecting the devices. In a looped bus system, the conversion operation of information type can be simplified or eliminated by making the type of transfer information on the bus coincide with the type of communication information handled by each node.

In a system used for a Broadband ISDN (Integrated Services Digital Network), for example, information is transmitted in packets of fixed length called the ATM (Asynchronous Transfer Mode) cells, as shown in FIG. 4. In the case where the above-mentioned looped bus is employed for the system making up a part of the Broadband ISDN, therefore, the information flowing on the looped bus is desirably of a type of fixed-length packet similar to the ATM cell.

FIG. 4 shows a type of ATM cell. The ATM cell 5 is a fixed-length packet of 53 bytes, for instance, and includes a 5-byte header 50 and a 48-byte user information 53. The header 50 has a 4-byte header information 51 and one-byte header check code 52.

When information of the ATM cell type described above is transmitted on a looped bus, the bus access must be controllable in time units corresponding to the length of the ATM cell if the bus is to be used efficiently. The time unit on the bus required for sending out each ATM cell is called the "slot". By generating information representing the time unit or position of each slot at the head of a looped bus, all the nodes connected with the particular bus can be supplied with the information on the time or position where the cell is to be written. In other words, the primary role of the head of bus function is to set a slot, which is the reason why the head of bus function is called the "slot generator" in the above-mentioned reference.

A time chart of signals flowing on the bus is shown in FIG. 5.

When slots 60-i, 60-(i+1), and so on are set at the head of bus (0), for example, these slots are sequentially transmitted to nodes 10-1, 10-2 and so on through the bus. The node 10-1, as shown in (1), for example, outputs ATM cells 70-1, 70-2 in specified or arbitrary slots. In similar fashion, the node 10-2, as shown in (2), outputs an ATM cell 71-1 to an empty slot.

Nodes successively send out cells in this way, and the output of the last node 10-n makes up an ATM cell train as shown in (n), and the resulting output (n+1) flows into the bus terminal. One of the termination of bus functions is to monitor the frequency of ATM cells in or the frequency of bus utilization by the cell train.

FIGS. 6 to 9 show a node configuration applied to the looped bus system of FIGS. 2 and 3.

Each node 10-i includes a physical interface function 103-i for accomplishing the interface with the bus and a media access control function 104-i for making access to the bus.

The media access control function 104-i has an access control function 100-i for controlling the bus access and bus control functions 102A-i and 102B-i. The head of bus functions 30a, 30b and the termination of bus functions 31a, 31b described above are included in the bus control function 102A-i or 102B-i.

The nodes located midway of the looped bus, i.e., those nodes not requiring the head of bus function and the termination of bus function, are operated to allow the bus control functions 102A-i and 102B-i to pass the received information, as shown in FIG. 6.

The nodes, like the node 10-1 in FIG. 2, providing the head and terminal of the bus A and the head and terminal of the bus B, are such that as shown in FIG. 7, the head of bus functions 30a, 30b and the termination of bus functions 31a, 31b in the bus control function 102A-i are active. In this case, the buses A and B are disconnected in the bus control function 102A-i, so that information is not transmitted from termination of bus function 31a to head of bus function 30a or from termination of bus function 31b to head of bus function 30a.

The node, like the node 10-5 in FIG. 3, which provides the head of bus A and the terminal of bus B adjacent to a point of failure is in such a condition that, as shown in FIG. 8, the head of bus function 30a and the termination of bus function 31b in the bus control function 102A-i are active.

Also, the node, like the node 10-4 in FIG. 3, which accommodates the head of bus B and the terminal of bus A adjacent to a point of failure, assumes a condition in which, as shown in FIG. 9, the head of bus function 30b and the termination of bus function 31a are active in the bus control function 102B-i.

In the aforementioned conventional looped bus system, the node 10-1 leading the looped bus under normal condition requires the head of bus A function 30a and the head of bus B function 30b at the same time. For this reason, the bus control function 102A-1 must be provided with the head of bus functions 30a and 30b as shown in FIG. 7.

Further, on the assumption that a bus failure has occurred between the node 10-1 and the adjacent node 10-2, for example, the node 10-1 is required to have the head of bus function 30b with the bus control function 102B-1. In other words, unlike the remaining buses requiring only two head of bus functions, the leading node 10-1 of the looped bus under normal condition requires three head of bus functions, thereby giving rise to the problem that a plurality of nodes having different structures are required for configuration of a looped bus system.

Furthermore, in the above-mentioned conventional looped bus system under normal condition, the heads of the bus A 20a and of the bus B 20b are arranged in the same node, so that upon occurrence of a bus failure, the heads of the bus A 20a and bus B 20b are arranged in different nodes determined by the position of failure. The resulting problem is that the operation for what is called "revertive switchover" is necessary when returning the bus to normal operating condition after the cause of bus failure is removed, which leads to a time loss.

SUMMARY OF THE INVENTION

An object of the invention is to provide a looped bus system having an improved structure which can be made up of a plurality of nodes of the same configuration.

Another object of the invention is to provide a looped bus system so configured that the operation can be easily switched between normal and failure conditions and a trouble-shooting procedure can be easily taken.

Still another object of the invention is to provide a looped bus system so configured that nodes can be easily added or removed.

In order to achieve the above-mentioned objects, according to one aspect of the invention, there is provided a looped bus system comprising a plurality of node means connected in loop by first and second buses in opposite directions of signal transmission, each of the node means including a head of bus function component and a termination of bus function component corresponding to the first and second buses respectively. Under normal operating conditions, at least two of the node means having the head and termination functions for the first and second buses are operated in such a manner that a part of the first and second buses for connecting the node means does not participate in the information transmission.

According to another aspect of the invention, there is provided a looped bus system, in which under normal operating conditions, the heads of the first and second buses are located at different nodes, so that the termination of bus function of the second bus is operated at the node having the head of bus function of the first bus, and the termination of bus function of the first bus is operated at the node having the head of bus function of the second bus.

According to still another aspect of the invention, there is provided a looped bus system, in which each node is such that the bus control function located on the input side of access control includes the head of bus function, and the bus control function located on the output side of the access control includes the termination of bus function.

According to a further aspect of the invention, there is provided a looped bus system in which under normal operating conditions, the head of bus function and the termination of bus function are located at different nodes, and therefore the bus portion between the node with the termination of bus function activated and the node with the head of bus function activated can be in an inoperative state not participating in the functions of the looped bus system.

In the event that a failure occurs at any part of the looped bus, therefore, the head of bus function and the termination of bus function are transferred (bus reconfigured) in such a manner that the inactive bus portion described above may be located at the failure point, thereby making it possible to operate the system after the time of failure in substantially the same condition as under normal operating conditions. Also, if the repair work on the failure is completed after reconfiguration, substantially the normal condition can be operated without any special operation like revertive switchover.

According to a still further aspect of the invention, there is provided a looped bus system, in which the operating condition of each node after reconfiguration is the same as that of each node under normal operating conditions of the whole configuration of the looped bus. It is thus possible to apply a homogeneous hardware configuration having the same bus control function to each node, thereby simplifying the software and the firmware for system control.

According to a yet further aspect of the invention, there is provided a looped bus system, in which after a node is added to the inactive bus portion not participating in the function of the looped bus, the head of bus function and the termination of bus function are transferred to the particular added node, thereby easily realizing the system expansion.

The foregoing and other objects, advantages, manner of operation and novel features of the present invention will be understood from the following detailed description when read in conjunction with the accompanying drawings.

DESCRIPTION OF THE PREFERRED EMBODIMENTS

Figure 1:
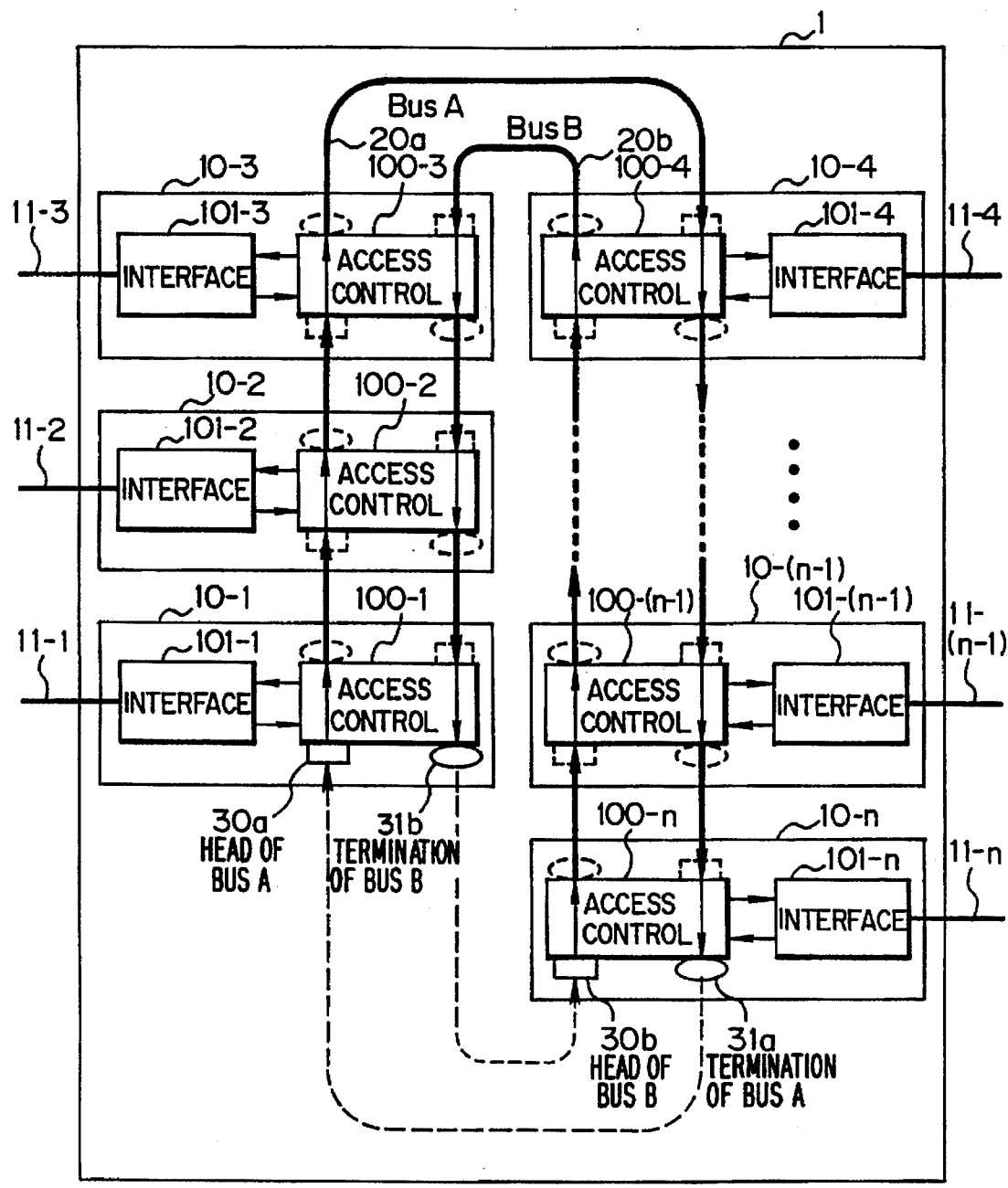
FIG. 1 is a diagram showing a block configuration of a looped bus system according to a first embodiment of the invention.
Figure 2:
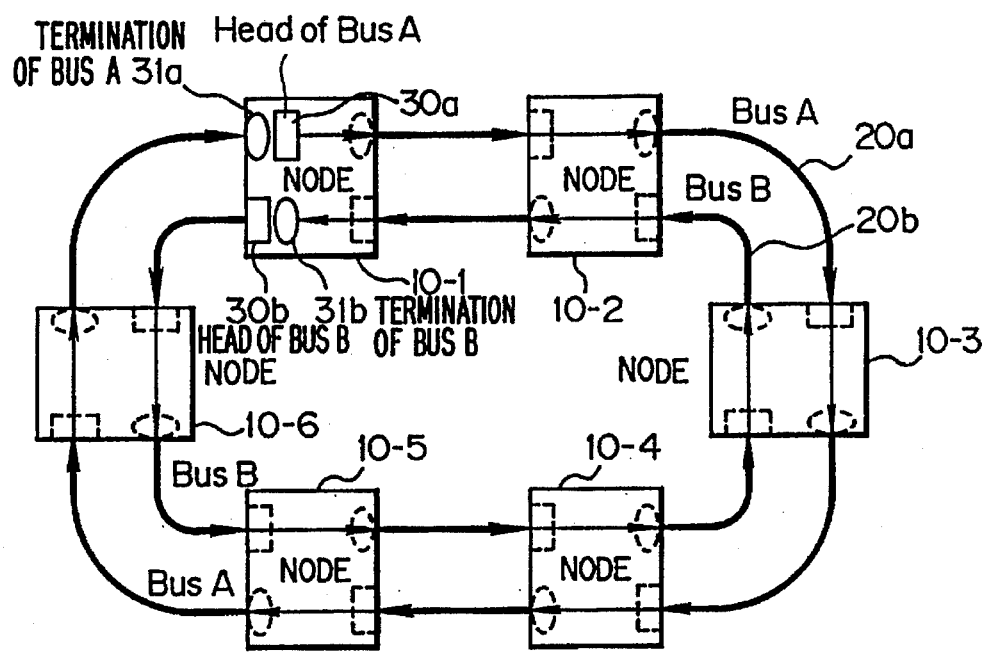
FIG. 2 is a block diagram showing the normal operating condition of a conventional looped bus system.
Figure 3:
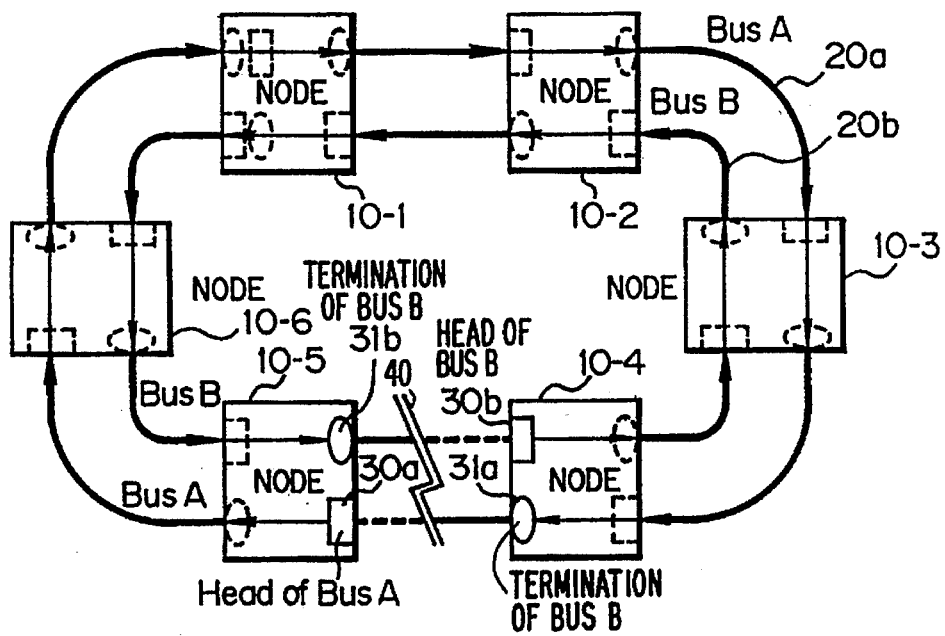
FIG. 3 is a block diagram showing the condition after bus reconfiguration of a conventional looped bus system.

A looped bus system according to an embodiment of the invention is shown in FIG. 1.

This embodiment represents the configuration of a looped bus system having the function of a switching system, in which a plurality of interface cards 10-i (10-1 to 10-n) including a line interface 101-i (101-1 to 101-n) and an access control component 100-i (100-1 to 100-n), are connected in loop by buses A and B, and the information that has arrived at the interface 101 from each line 11-i (11-1 to 11-n) can be output to another arbitrary interface.

The access control component 100-i (100-1 to 100-n) of each interface card 10 functions as a node of a looped bus.

The information (in packet or cell) that has arrived from the line 11-i is terminated at the interface 101-i and sent to the access control component 100-i. The access control component 100-i decides on the destination interface card 10-j (10-1 to 10-n; j≠i) to be output from the header information contained in the received information, and outputs information to an empty slot of the bus (A) 20a or bus (B) 20b in forward direction with respect to the destination interface card 10-j.

The destination interface card 10-j has the access control component 100-j (100-1 to 100-n; j≠i) read the information addressed to the self node from the bus and sends it to the interface 101-j (101-1 to 101-n j≠i).

The interface 101-j, after taking an action on the received information from the access control component as required for transmitting to the line 11-j, (11-1 to 11-n j≠i) outputs the information to the line 11-j.

In the looped bus system shown in FIG. 1, the head of bus function 30a for the bus (A) 20a is operated by the interface card 10-1, and the head of bus function 30b for the bus (B) 20b is operated by the interface card 10-n. Further, the termination of bus function 31a for the bus (A) 20a is operated by the interface card 10-n, and the termination of bus function 31b for the bus (B) 20b is operated by the interface card 10-1. In this case, the bus portion between the nodes 10-1 and 10-n is located between the termination of bus functions 31a, 31b and the head of bus functions 30a, 30b. Therefore, as shown by dashed line, the bus portion directly between interface nodes 10-1 and 10-n does not participate in the information transmission by the looped bus.

Figure 10:
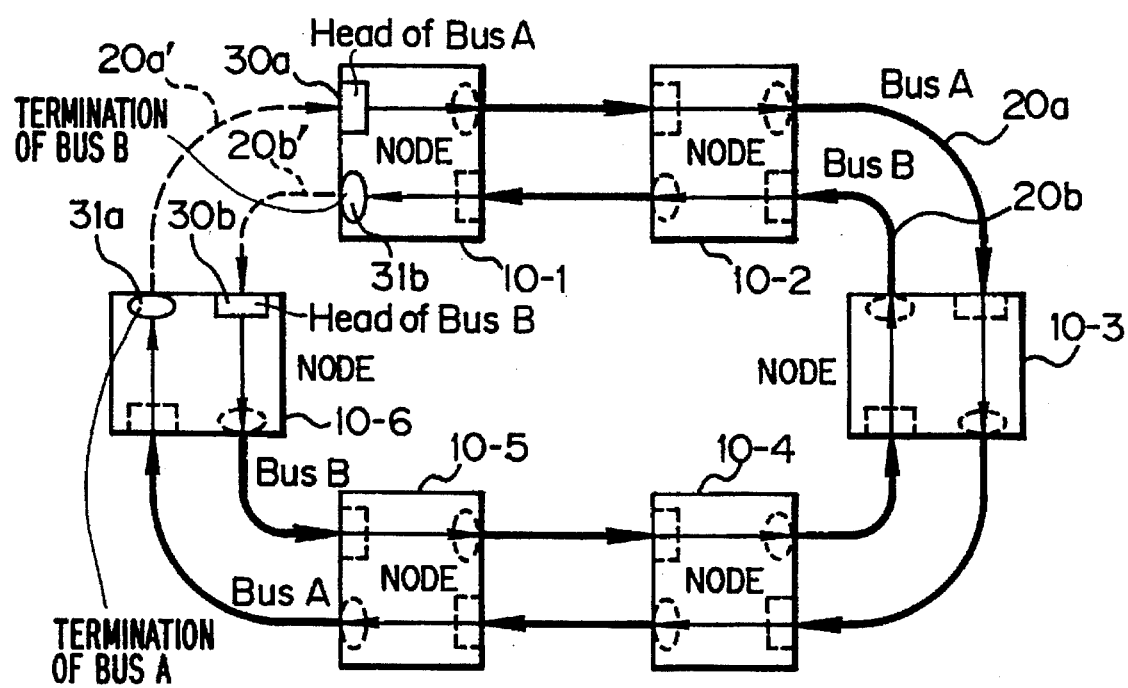
FIG. 10 is a block diagram for explaining the configuration of a looped bus system according to the present invention.

FIG. 10 is a block diagram simplified by eliminating the interface 10 in FIG. 1 with nodes reduced to six for explaining the functions of a looped bus according to the present invention.

Nodes 10-1 to 10-6 are connected to unidirectional bus (A) 20a and unidirectional bus (B) 20b for transmitting signals in opposite directions and perform the function of sending and receiving information to and from the buses.

These buses 20a and 20b have the appearance of a loop, but are functionally limited in information transmission range, as they have a bus origin (head of bus) and a bus terminal with the nodes 10-1 and 10-6 as an endpoint respectively.

The head of bus functions 30a, 30b are located at the respective head of bus, and the termination of bus functions 31a, 31b at the respective terminal of bus. The head of bus functions 30a, 30b perform the function of designating the time slot for each node to send out information onto the buses. The termination of bus functions 31a, 31b, on the other hand, have the function of monitoring the information flowing in the buses as required and discarding the information that has arrived from the buses.

Figure 4:
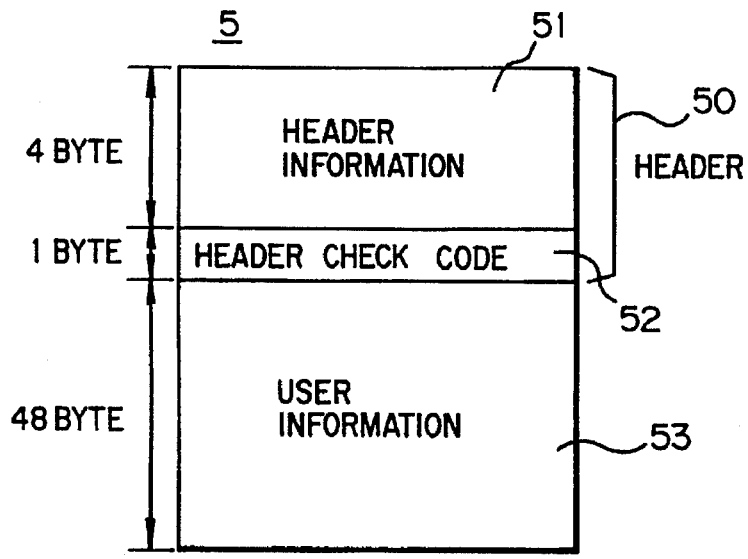
FIG. 4 is a diagram showing an example of the ATM cell format.
Figure 5:
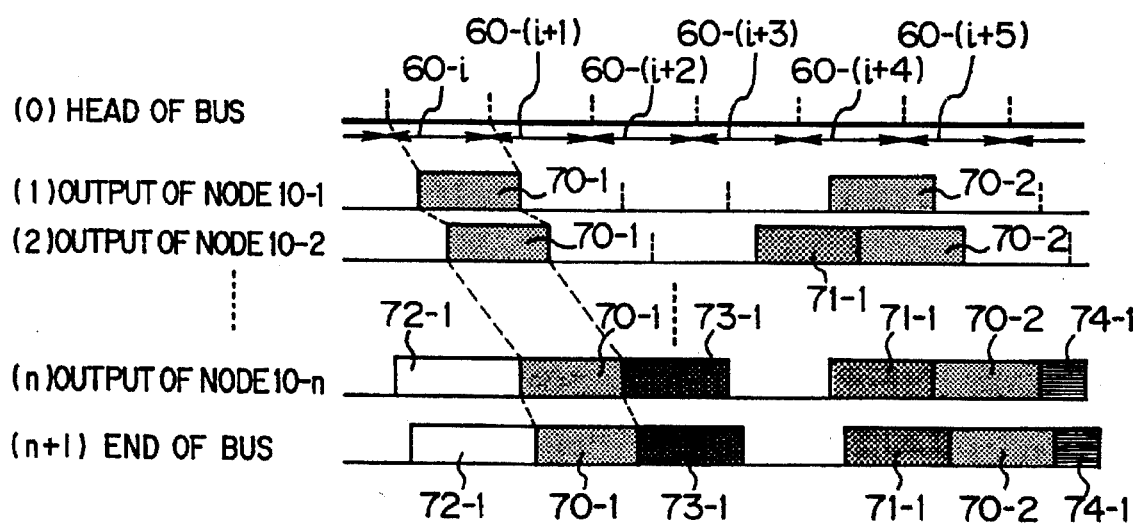
FIG. 5 is a timing chart for explaining the signals on a looped bus system.

Although various forms are applicable as the type of information transmitted on the buses, explanation will be made below with reference to an example to which the ATM cell (FIG. 4) used for the Broadband ISDN is applied.

As shown in FIG. 10, a looped bus system according to the invention has the feature that the head of bus function 30a for the bus (A) 20a is operated on the node 10-1 different from the node 10-6 in which the head of bus function 30b is operated for the bus (B) 20b.

The termination of bus function 31b for the bus (B) 20b is operated at the node 10-1 identical to the head of bus function 30a for the bus (A) 20a, and the termination of bus function 31a for the bus (A) 20a is operated at the node 10-6 identical to the head of bus function 30b for the bus (B) 20b. Although the bus portions 20a' and 20b' between the adjacent nodes 10-1 and 10-6 apparently connect the nodes, they constitute unused bus portions not functionally contributing to the information transmission.

These unused bus portions have no effect on the configuration and function of the looped bus even if a bus failure occurs at any of these portions. In a system according to the invention, therefore, the system configuration under normal conditions can be the same as that when a failure occurs in a portion of the buses.

Figure 6:
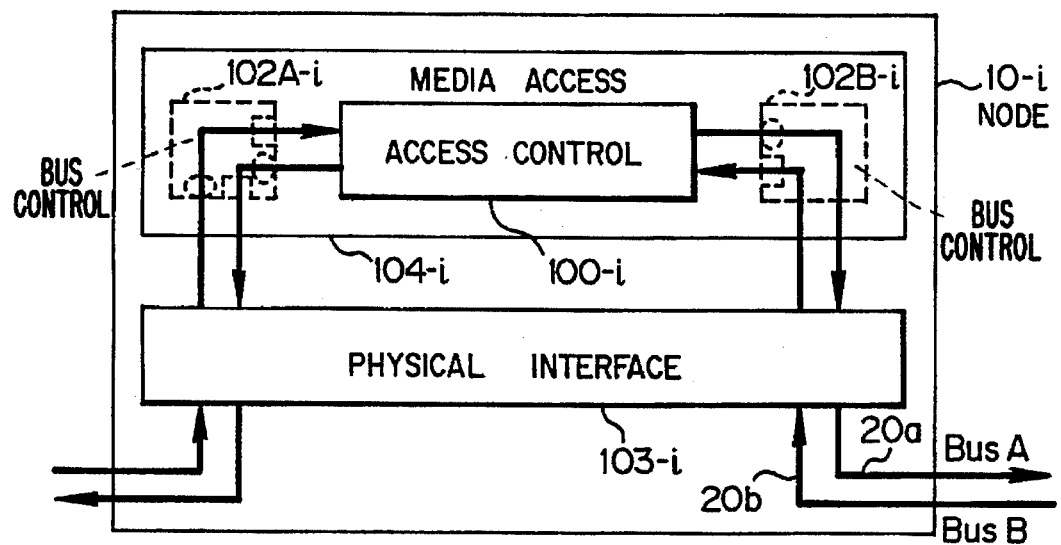
FIG. 6 is a functional block diagram showing a configuration of nodes existing midway of a looped bus of a conventional looped bus system.
Figure 7:
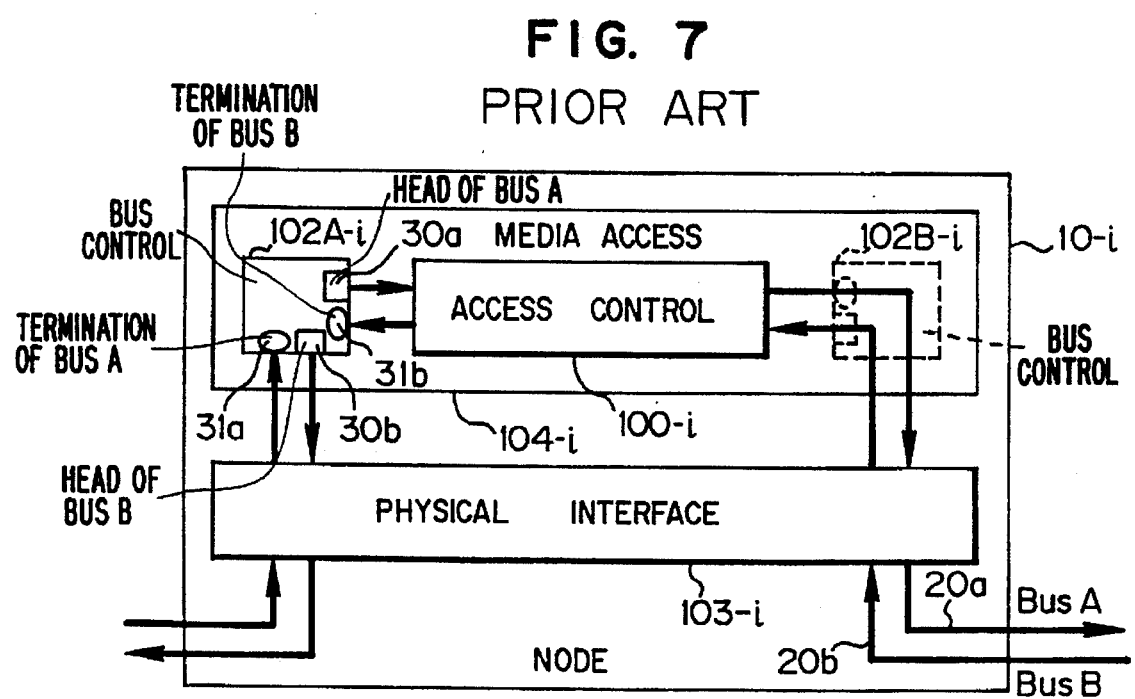
FIG. 7 is a functional block diagram showing the configuration of nodes having a head of bus function under normal conditions of a conventional looped bus system.
Figure 8:
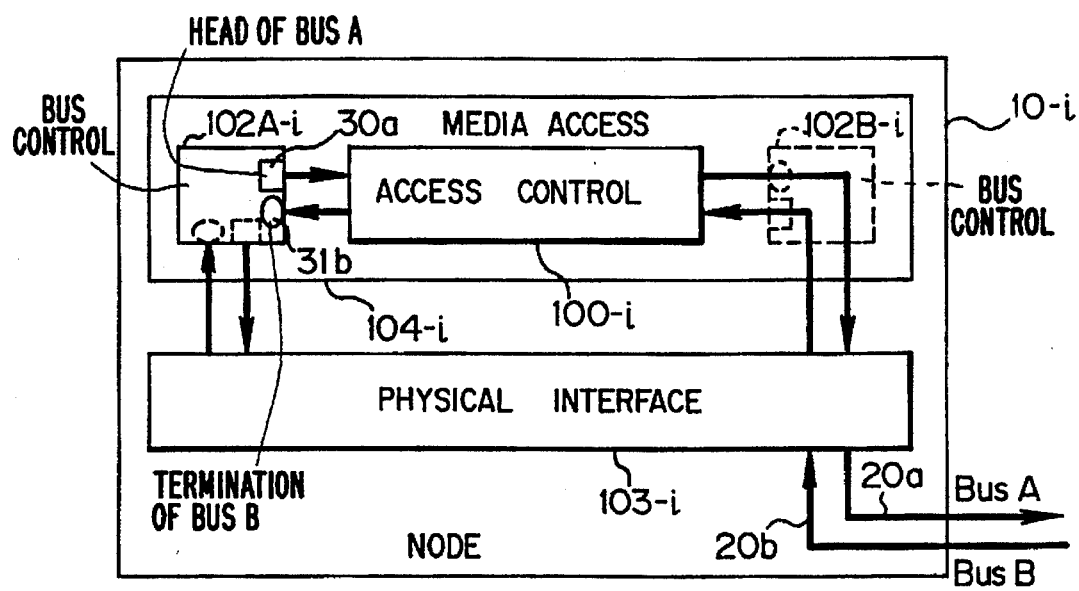
FIG. 8 is a functional block diagram showing the configuration of nodes having the head function of bus A at the time of reconfiguration of a conventional looped bus system.
Figure 9:
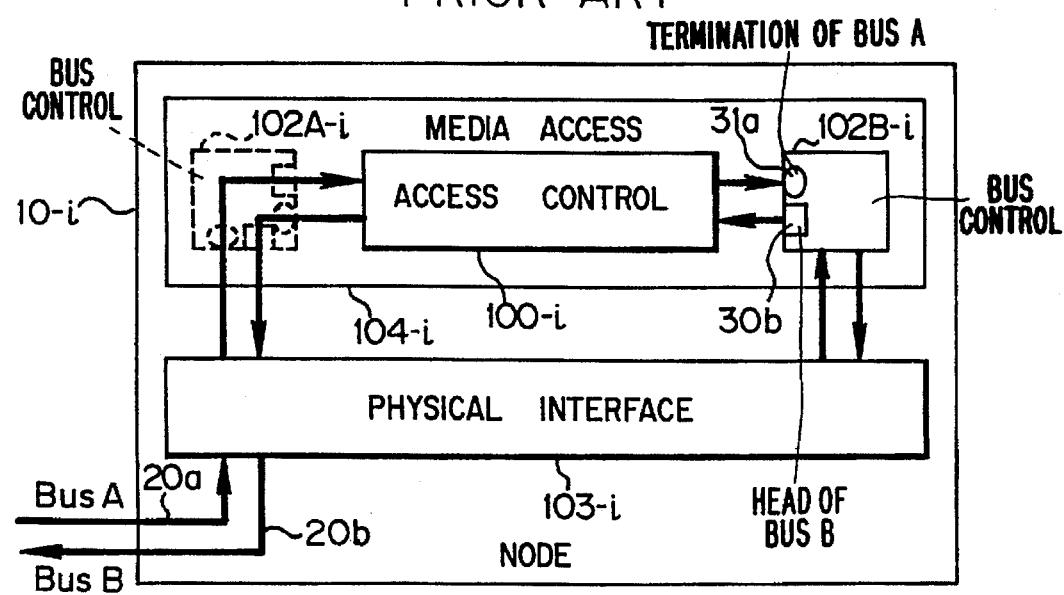
FIG. 9 is a functional block diagram showing the configuration of nodes having the head function of bus B at the time of reconfiguration of a conventional looped bus system.
Figure 11:
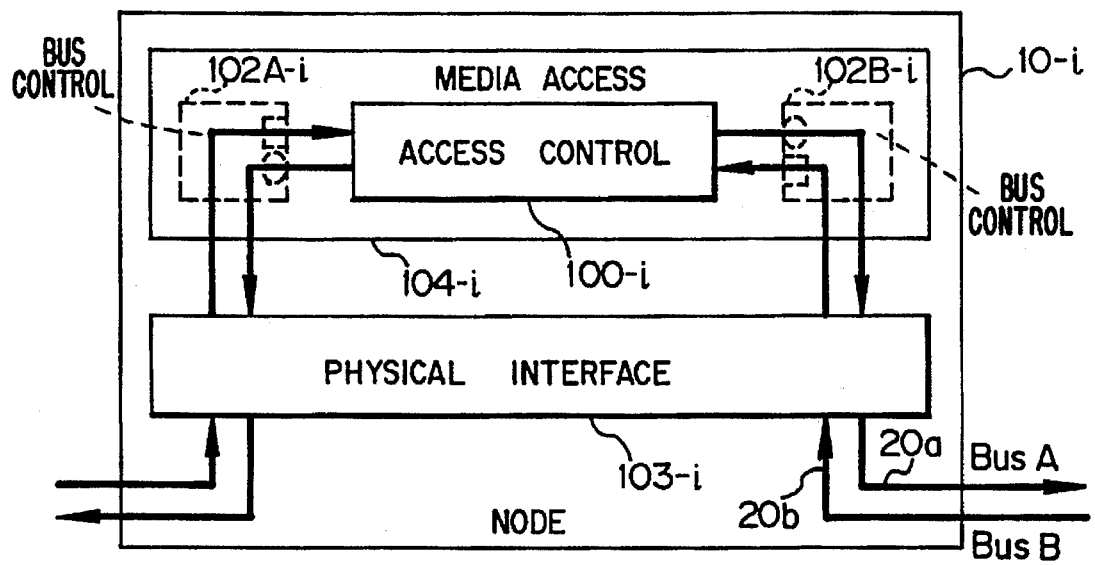
FIG. 11 is a functional block diagram showing the configuration of nodes midway of a looped bus of a looped bus system according to the present invention.

The function of a node midway of the buses of a looped bus system according to the present invention is shown in FIG. 11. Each node 102-i, 10-i in which the bus control components 102A-i and 102B-i assume an inactive mode for relaying the received information except when the particular node is an origin or a terminal of the buses, has the function similar to that of the conventional node configured as shown in FIG. 6.

Figure 12:
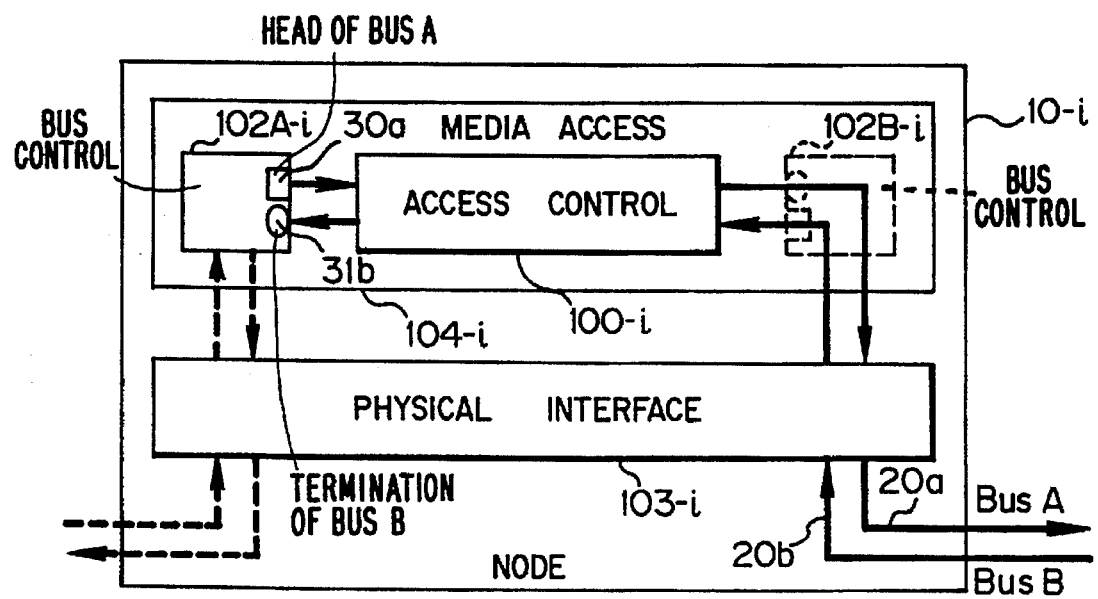
FIG. 12 is a functional block diagram showing the configuration of the node located at the head of bus A of a looped bus system according to the invention.

FIG. 12 shows a functional configuration of a node at a head of the bus (A) 20a. In this case, the head of bus function of the bus control component 102A-i is activated for the bus (A) 20a to start the function as a slot generator. At the same time, the termination of bus function 31b in the bus control component 102A-i is activated to perform the terminating operation for the bus (B) 20b.

Both the head and termination of bus functions are thus performed so that the downstream portion of the bus B connected to the bus control component 102A makes up unused portions not participating in the information transmission.

Figure 13:
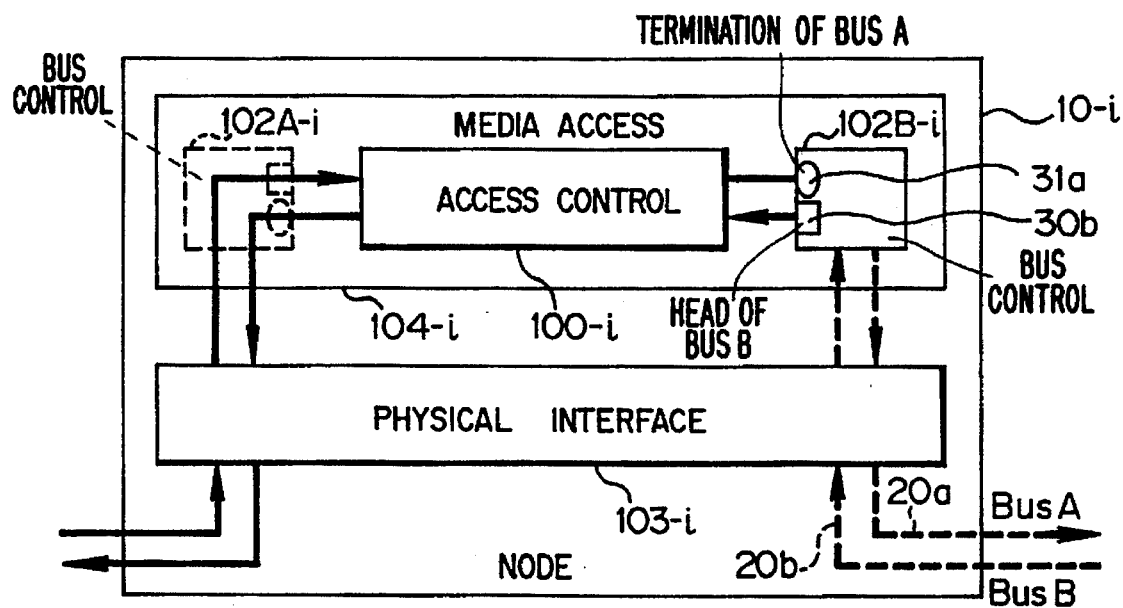
FIG. 13 is a functional block diagram showing the configuration of the node located at the head of bus B of a looped bus system according to the invention.

The functional configuration of the node at a head of the bus (B) 20b is shown in FIG. 13.

The head of bus function 30b in the bus control component 102B-i is activated for the bus (B) 20b, thereby to perform the function as a slot generator. Also, the termination of bus function 31a in the bus control function 102B-i is activated; thereby to terminate the bus (A) 20. As a result, the downstream portion of the bus A connected to the bus control section 102B remains unused until subsequent bus reconfiguration.

As obvious from FIGS. 10 to 12 above, in a looped bus system according to the invention, each node has bus control components 102A-i and 102B-i between the access control component 100-i and the buses. Each of the bus control components has a head of bus function 30 (30a or 30b) and a termination of bus function 31 (31a or 31b). Unlike in the prior art, it is not necessary for the node at a head of the bus under normal conditions to have a special configuration different from that of the other nodes. The looped bus system thus can be configured with a plurality of nodes having a uniform structure.

Figure 14:
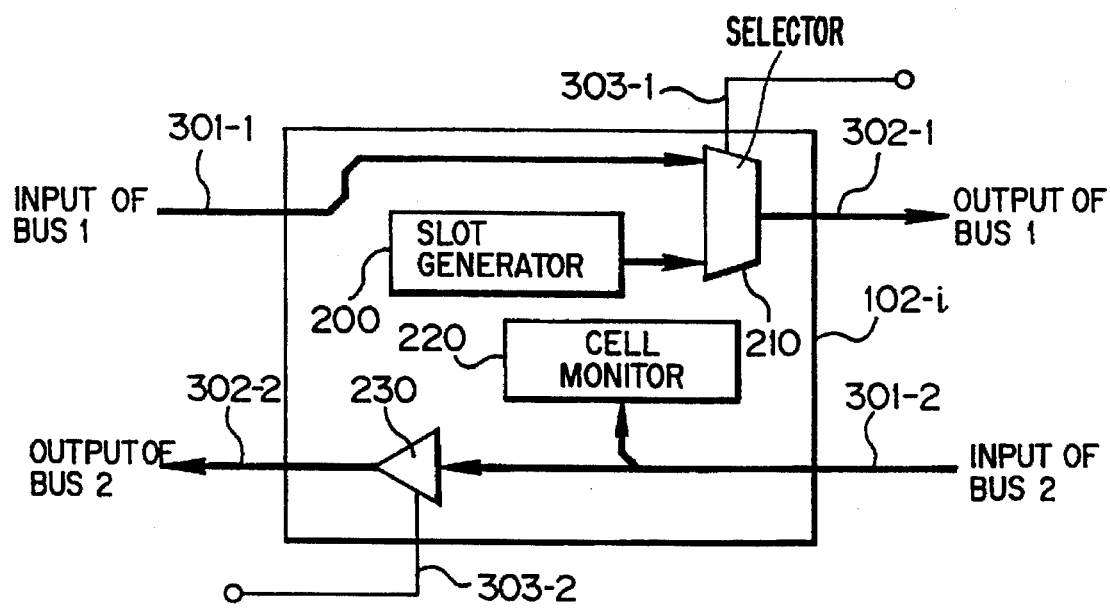
FIG. 14 is a functional block diagram showing the bus control component of each node of a looped bus system according to an embodiment of the invention.

FIG. 14 is a diagram showing an example of configuration of the bus control component 102-i. For generalization of the description, the buses connected to the bus control component in place of buses A and B are designated as "bus 1" and "bus 2" respectively.

The bus control section 102-i includes a selector 210 for selecting the output of the slot generator 200 or the input line 301-1 of the bus 1 and sending it out to the output line 302-1 of the bus 1, a cell monitor 220 connected to the input line 301-2 of the bus 2, and a gate 230 inserted between the input line 301-2 and the output line 302-2 of the bus 1. The operation of the selector 210 and the gate 230 is adapted to be controlled by the control signals from the control signal lines 303-1, 303-2 respectively.

In the case where the bus control section 102-i corresponds to each bus control component belonging to a node midway of the bus shown in FIG. 11, such as the bus control component 102B-i immediately after the access control component 100-i for the node at a head of the bus A shown in FIG. 12, or the bus control component 102A-i immediately after the access control component 100-i for the node at a head of the bus B shown in FIG. 13, the bus input information is allowed to pass as a bus output. A control signal is thus applied in such a manner that the selector 210 selects the input line 301-1 of the bus 1 and the gate 230 is open. In this case, the monitor result of the cell monitor 220 is ignored.

If the bus control component 102-i is associated with the bus control component 102B-i 102A-1 immediately before the access control component 100-i for the node at a head of the bus A shown in FIG. 12 or the bus control component 102A-i 102B-1 immediately before the access control component 100-i for the node at a head of the bus B shown in FIG. 13, then in order to activate the head of bus function 30b and the termination of bus function, 31a, the selector 210 selects the output of the slot generator 200 and applies a control signal in such a manner as to close the gate 230 thereby to activate the cell monitor 220.

Figure 15:
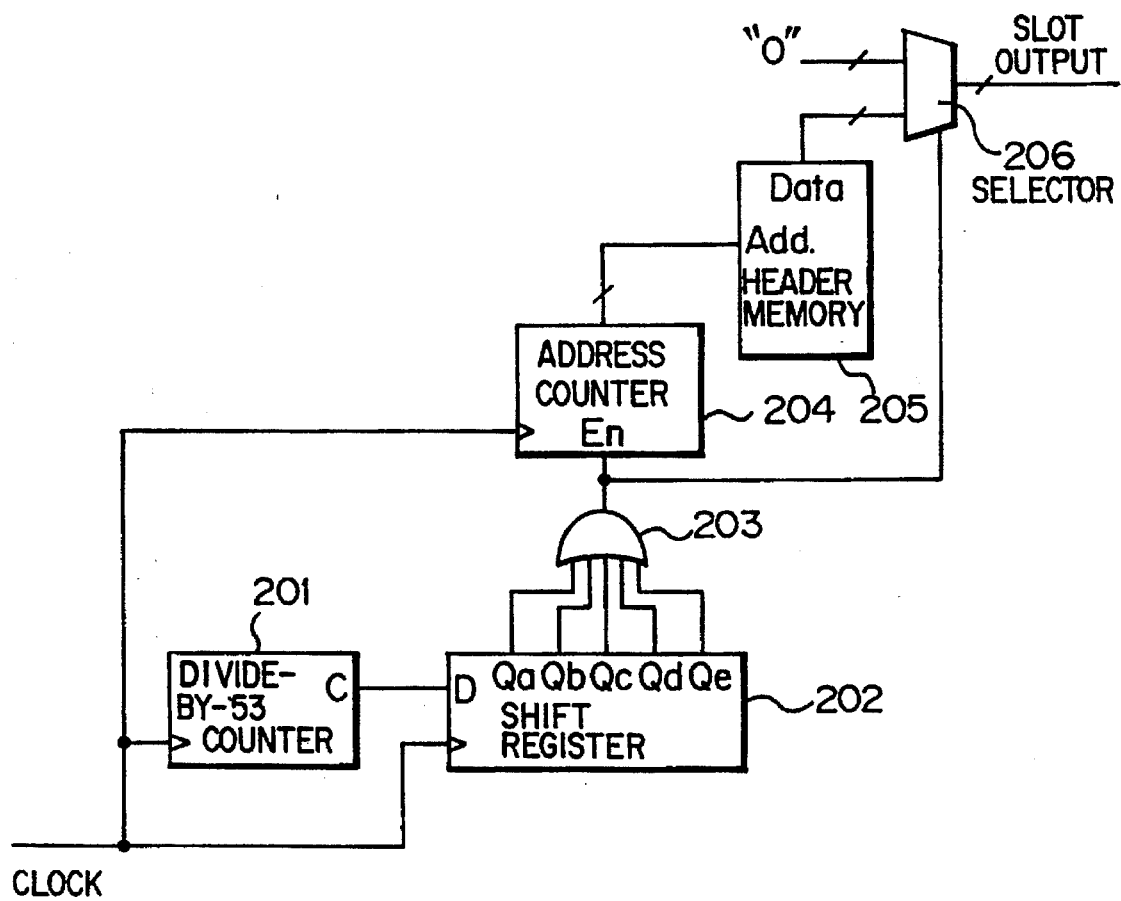
FIG. 15 is a functional block diagram showing a slot generator of the bus control component according to an embodiment.

An example of configuration of the slot generator 200 is shown in FIG. 15.

The slot generator 200, in order to generate time slots in time units corresponding to one cell (53 bytes), counts primary clocks equivalent to one byte on a divide-by-53 counter 201, so that the counter 201 generates a timing signal representing the head of each cell. The cell head signal and the primary clock are applied to a shift register 202. The output at each stage of the shift register 202 is applied to an OR circuit 203, whereby a signal representing a cell header section is generated during the 5-byte period from each cell head.

The cell header signal is applied as an enable signal to an address counter 204, where the primary clock is counted. As a result, the up-count during the cell header section is obtained, and a header memory 205 is accessed with the count as an address.

The header memory 205 has stored therein header information (including header check code) for each slot to be generated at the slot generator 200. The header information is thus read out and applied to the selector 206 for each header section of each time slot. The selector 206 selects the output of the header memory 205 in accordance with the output of the OR circuit 203 during the cell header period, and selects a "0" signal during the remaining period. As a consequence, a cell frame is generated which is composed of a 5-byte header followed by a 48-byte user information section ("0" bit section) in each time slot.

Figure 16:
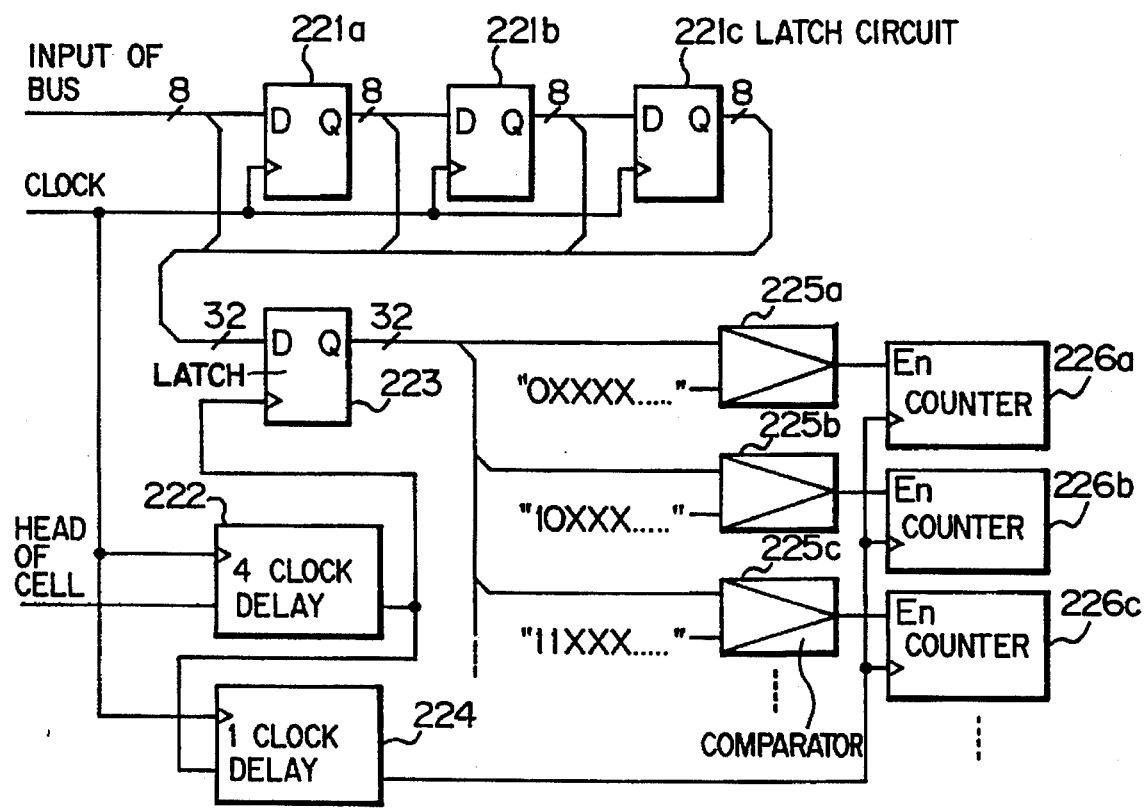
FIG. 16 is a functional block diagram showing a cell monitor of the bus control component according to an embodiment.

FIG. 16 is a diagram showing an example of configuration of the cell monitor 220.

The signals inputted from the bus in units of bytes are successively latched at latch circuits 221a to 221c, so that the contents of the leading four bytes of each cell (header information section) are converted to 32-bit parallel signals and supplied to a 32-bit latch circuit 223.

The output of the latch circuit 223 is applied to comparators 225a, 225b, 225c, and so on in parallel, and is compared with the data stored in the register (such as constants and variables to be contained as header information), thereby identifying the type, etc. of the input cell.

In the shown case, the identification by type is applied to counters 226a, 226b, 226c and so on, and the number of arriving cells is measured for each cell type. The counter 226a, for example, counts the slots with the most significant bit of 0 of the leading byte as the number of empty slots.

A 4-clock delay circuit 222 is for generating the timing signal for latching the header information in the latch circuit 223 from the timing signal representing the cell head and the primary clock. A one-clock delay circuit 224, on the other hand, generates the timing for the count-up operation of counters 226a, 226b, 226c and so on from the output of the 4-clock delay circuit 222 and the primary clock.

Now, the reconfiguration operation of the buses for a switching system 1 to which the looped bus configuration according to the present invention shown in FIG. 1 is applied will be explained with reference to FIGS. 17 to 19.

Figure 17:
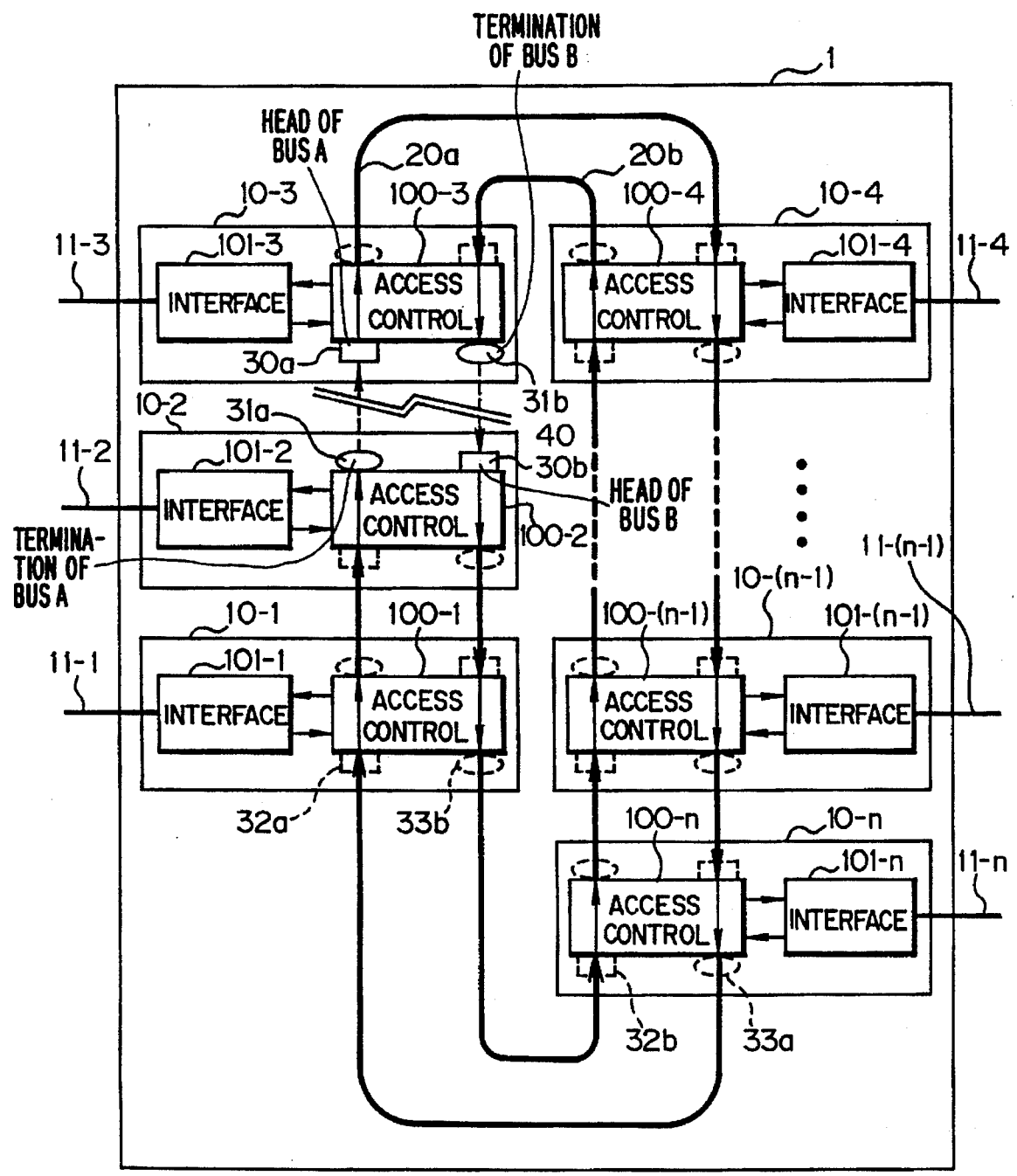
FIG. 17 is a block diagram for explaining the reconfiguration of a looped bus under bus failure of a looped bus system according to the invention.

FIG. 17 shows the state in which a bus failure 40 has occurred between interface cards (nodes) 10-2 and 10-3. In this case, the head of bus function 32a of the bus (A) 20a that has thus far functioned is set to inactive mode, and instead the head of bus function 30a of the node 10-3 is activated. Also, the head of bus function 32b of the bus (B) 20b is set to inactive mode, with the head of bus function 30b of the node 10-2 activated in its place.

A similar procedure is taken also for the termination of bus functions. Specifically, the termination of bus function 31a of the node 10-2 is activated in place of the termination of bus function 33a that has thus far been active, and the termination of bus function 33b is replaced by the termination of bus function 31b of the node 10-3.

As comparison between FIG. 1 and FIG. 17 clearly shows, the bus reconfiguration described above causes the unused bus portion (break in the loop) that has thus far been present between the nodes 10-1 and 10-n to move to the bus portion between the nodes 10-2 and 10-3. Since the relative positions of the head of bus functions 30a, 30b and the termination of bus functions 31a, 31b remain unchanged, however, it is not necessary to distinguish between the bus configuration under normal condition and that under failure condition for the purpose of control.

Figure 18:
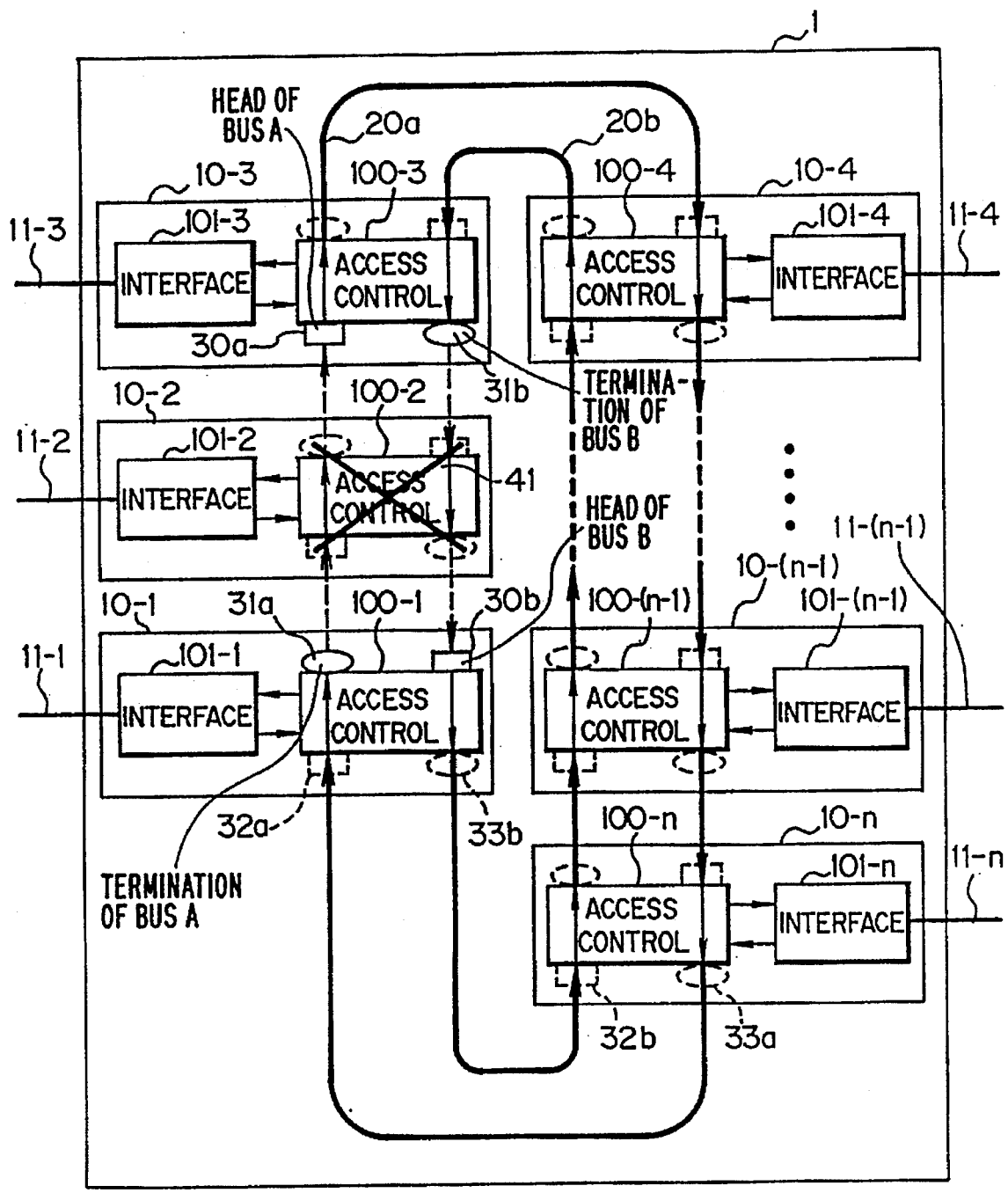
FIG. 18 is a block diagram for explaining the reconfiguration of a looped bus under node failure of a looped bus system according to the invention.

FIG. 18 shows an example of the looped bus reconfiguration when a failure condition occurs to an interface card (node) itself, shown as interface card(node) 10-2.

In this case, the head of bus function 30a of the node 10-3 is activated in place of the head of bus function 32a of the bus (A) 20a. With regard to the bus (B) 20b, on the other hand, the head of bus function 30b of the node 10-1 is activated in place of the head of bus function 32b.

This applies similarly to the termination of bus function. Specifically, the termination of bus function 31a of the node 10-1 is activated in place of the termination of bus function 33a, and the termination of bus function 31b of the node 10-3 is activated in place of the termination of bus function 33b.

As comparison between FIGS. 1 and 18 apparently shows, with the bus reconfiguration described above, the break in the loop that has thus far been between the nodes 10-1 and 10-n moves to the intermediate between the nodes 10-1 and 10-3. In this case, even though the number of nodes decreases, the relative positions between the head of bus functions 30a, 30b and the termination of bus functions 31a, 31b remain unchanged. For the purpose of system control, therefore, it is not necessary to distinguish between the normal and failure conditions in bus configuration.

Figure 19:
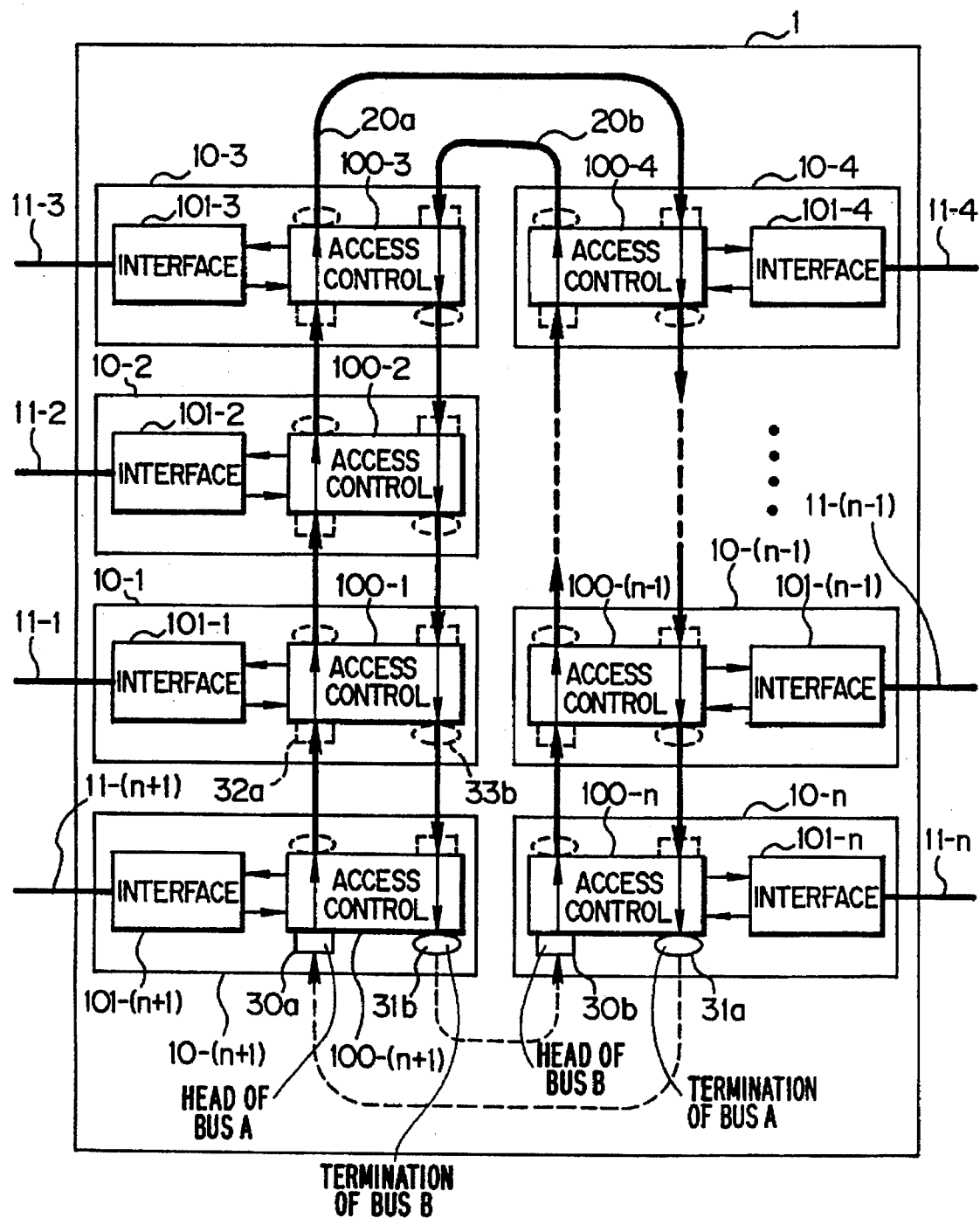
FIG. 19 is a block diagram for explaining the reconfiguration of a looped bus at the time of node addition of a looped bus system according to the invention.

FIG. 19 is a diagram showing an example of bus reconfiguration effected after adding an interface card 10-(n+1) anew in the switching system shown in FIG. 1.

At the time when the new node 10-(n+1) is inserted in the bus, the termination function 31a of the bus (A) 20a is present in the node 10-n, and the termination function 31b of the bus (B) 20b in the node 10-1. Therefore, the bus portion between the nodes 10-1 and 10-n is unused. Even if a new interface card (node) is inserted in the particular portion, the communication operation between the other interface cards (nodes) is not affected.

After the new node 10-(n+1) is inserted in the loop, the head of bus function 30a of the node 10-(n+1), instead of the head of bus function 32a in the bus (A) 20a, is activated, and so is the termination of bus function 31b of the node 10-(n+1) instead of the termination of bus function 33b of the bus (B) 20b.

This reconfiguration forms a looped bus with an increased number of nodes requiring only one movement of the head of bus function and the termination of bus function, and therefore has very little effect on the system operation.

Although an interface card is formed for each node in the aforementioned embodiments, the present invention is applicable with equal effect to a system configuration in which a single interface card may have a plurality of node functions and the work of addition and deletion can be performed for a plurality of nodes as a unit.

What is claimed is:

1. A looped bus system comprising a plurality of nodes; and first and second buses connecting the plurality of nodes in a loop and having opposite directions of signal transmission, wherein each of the nodes includes a head of bus function and a termination of bus function for each of the first and second buses such that under normal conditions said system is operable in such a manner that the head of bus function for the first bus and the termination of bus function for the second bus are activated in a first one of the nodes, the termination of bus function for the first bus and the head of bus function for the second bus are activated in a second one of the nodes, and the head of bus function and the termination of bus function for the first and second buses are inactive in the remaining nodes so that a first portion of the loop is in use and a second portion of the loop is not in use, and upon a failure in one of the buses in the first portion of the loop, the system is operable in such a manner that:

the head of bus function for the first bus and the termination of bus function for the second bus are activated in a third one of nodes adjacent to the failure;

the termination of bus function for the first bus and the head of bus function for the second bus are activated in a fourth one of nodes adjacent to the failure; and the head of bus function and the termination of bus function for both the first and second buses are inactivated in both the first and second ones of the nodes so that a portion of the loop adjacent the failure is retained unused.

2. A looped bus system comprising a plurality of nodes; and first and second buses connecting the plurality of nodes in a loop and having opposite directions of signal transmission, wherein each of the nodes includes a head of bus function and a termination of bus function for each of the first and second buses such that under normal conditions said system is operable in such a manner that the head of bus function for the first bus and the termination of bus function for the second bus are activated in a first one of the nodes, the termination of bus function for the first bus and the head of bus function for the second bus are activated in a second one of the nodes, and the head of bus function and the termination of bus function for the first and second buses are inactive in the remaining nodes so that a first portion of the loop is in use and a second portion of the loop is not in use, and upon a failure in one of the nodes, the system is operable in such a manner that:

the head of bus function for the first bus and the termination of bus function for the second bus are activated in a third one of nodes adjacent to the failed one of the nodes;

the termination of bus function for the first bus and the head of bus function for the second bus are activated in a fourth one of nodes adjacent to the failed one of the nodes; and the head of bus function and the termination of bus function for both the first and second buses are inactivated in both the first and second ones of the nodes so that the failed one of the nodes and a portion of the loop adjacent thereto are retained unused.

3. A looped bus system comprising a plurality of nodes; and first and second buses connecting the plurality of nodes in a loop and having opposite directions of signal transmission, wherein each of the nodes includes a head of bus function and a termination of bus function for each of the first and second buses such that under normal conditions said system is operable in such a manner that the head of bus function for the first bus and the termination of bus function for the second bus are activated in a first one of the nodes, the termination of bus function for the first bus and the head of bus function for the second bus are activated in a second one of said nodes, and the head of bus function and the termination of bus function for the first and second buses are inactive in the remaining nodes so that a first portion of the loop is in use and a second portion of the loop is not in use, and upon a need to install a new node in the system, the system is operable in such a manner that:

one of (i) the head of bus function for the first bus and the termination of bus function for the second bus and (ii) the termination of bus function for the first bus and the head of bus function for the second bus is activated in the new node to replace corresponding head of bus and termination of bus functions in one of the first and second nodes; and said corresponding head of bus and termination of bus functions in said one of the first and second nodes are terminated so that the system is operated with the new node.

4. In a looped bus system including a plurality of nodes, and first and second buses connecting the plurality of nodes in a loop and having opposite directions of signal transmission, wherein each of the nodes includes a head of bus function and a termination of bus function for each of the first and second buses such that under normal conditions said system is operable in such a manner that the head of bus function for the first bus and the termination of bus function for the second bus are activated in a first one of the nodes, the termination of bus function for the first bus and the head of bus function for second bus are activated in a second one of the nodes, and the head of bus function and the termination of bus function for the first and second buses are inactive in the remaining nodes so that a first portion of the loop is in use and a second portion of the loop is not in use, a reconstruction method for the system when a failure occurs in one of the buses in the first portion of the loop, said method comprising the steps of:

(a) activating the head of bus function for the first bus and the termination of bus function for the second bus in a third one of the nodes adjacent to the failure;

(b) activating the termination of bus function for the first bus and the head of bus function for the second bus in a fourth one of the nodes adjacent to the failure; and (c) inactivating the head of bus function and the termination of bus function for both the first and second buses in both the first and second ones of the nodes so that a portion of the loop adjacent the failure is retained unused.

5. In a looped bus system including a plurality of nodes, and first and second buses connecting the plurality of nodes in a loop and having opposite directions of signal transmission, wherein each of the nodes includes a head of bus function and a termination of bus function for each of the first and second buses, such that under normal conditions said system is operable in such a manner that the head of bus function for the first bus and the termination of bus function for the second bus are activated in a first one of the nodes, the termination of bus function for the first bus and the head of bus function for second bus are activated in a second one of the nodes, and the head of bus function and the termination of bus function for the first and second buses are inactive in the remaining nodes so that a first portion of the loop is in use and a second portion of the loop is not in use, a reconstruction method for the system when a failure occurs in one of the nodes, said method comprising the steps of:

(a) activating the head of bus function for the first bus and the termination of bus function for the second bus in a third one of the nodes adjacent to the failed one of the nodes;

(b) activating the termination of bus function for the first bus and the head of bus function for the second bus in a fourth one of the nodes adjacent to the failed one of the nodes; and (c) inactivating the head of bus function and the termination of bus function for both the first and second buses in both the first and second ones of the nodes so that the failed one of the nodes and a portion of the loop adjacent thereto are retained unused.

6. In a looped bus system including a plurality of nodes; and first and second buses connecting the plurality of nodes in a loop and having opposite directions of signal transmission, wherein each of the nodes includes a head of bus function and a termination of bus function for each of the first and second buses such that under normal conditions said system is operable in such a manner that the head of bus function for the first bus and the termination of bus function for the second bus are activated in a first one of the nodes, the termination of bus function for the first bus and the head of bus function for second bus are activated in a second one of the nodes, and the head of bus function and the termination of bus function for each of the first and second buses are inactive in the remaining nodes so that a first portion of the loop is in use and a second portion of the loop is not in use, a reconstruction method for the system for installing a new node in the system, said method comprising the steps of:

(a) connecting the new node to the first and second buses in a portion of the loop that is not in use;

(b) in the new node, activating one of (i) the head of bus function for the first bus and the termination of bus function for the second bus and (ii) the termination of bus function for the first bus and the head of bus function for the second bus, to replace corresponding head of bus and termination of bus functions in one of the first and second nodes; and (c) inactivating said corresponding head of bus and termination of bus functions in said one of the first and second nodes so that the system is operated with the new node.

7. A reconstruction method according to claim 6, wherein the new node is to be in the first portion of the loop, said method further comprising before step (a) the steps of:

activating the head of bus function for the first bus and the termination of bus function for the second bus in a third one of the nodes adjacent the new node;

activating the termination of bus function for the first bus and the head of bus function for the second bus in a fourth one of the nodes adjacent to the new node; and inactivating the head of bus function and the termination of bus function for both the first and second buses in both the first and second nodes so that the bus portions adjacent to the new node are unused.

* * * * *